INVENTOR
ELMAN R. DUNN

March 20, 1973  E. R. DUNN  3,721,046
HORIZONTAL DISC GRINDER WITH EQUAL FEED
CONTROL FROM WORKPIECE CONTACT
Filed July 2, 1970  3 Sheets-Sheet 2
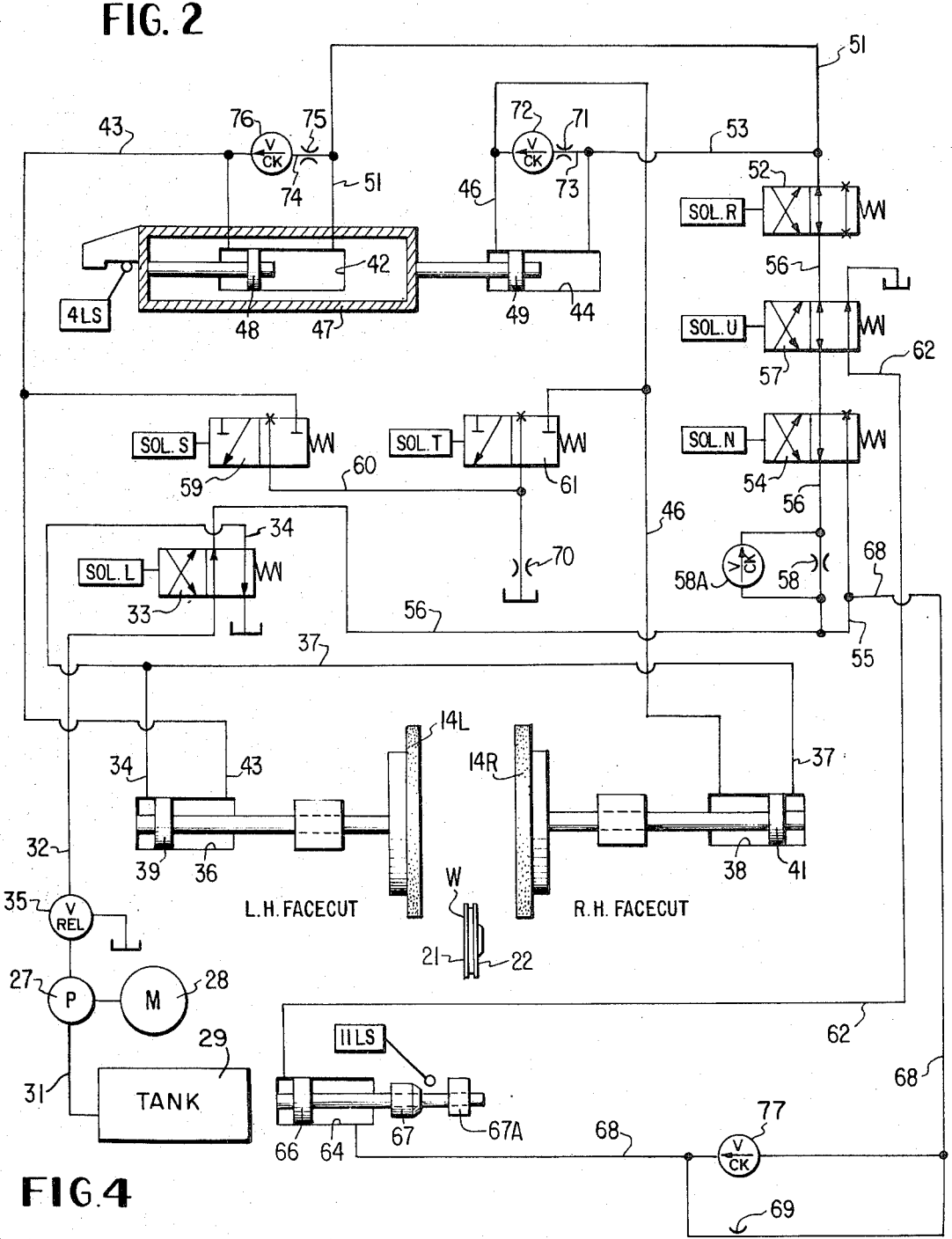
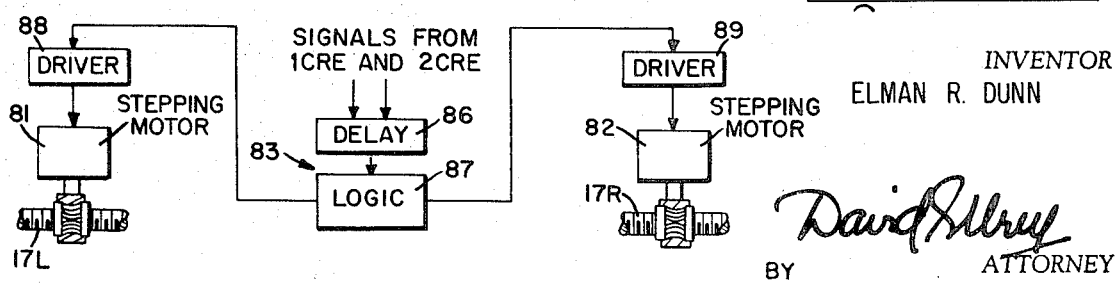
INVENTOR
ELMAN R. DUNN
David Allrey
BY  ATTORNEY

United States Patent Office 3,721,046
Patented Mar. 20, 1973

3,721,046
HORIZONTAL DISC GRINDER WITH EQUAL FEED CONTROL FROM WORKPIECE CONTACT
Elman R. Dunn, Roscoe, Ill., assignor to Litton Industries, Inc., Beverly Hills, Calif.
Filed July 2, 1970, Ser. No. 51,860
Int. Cl. B24b 7/04
U.S. Cl. 51—118     6 Claims

ABSTRACT OF THE DISCLOSURE

An automatic feed apparatus for a horizontal disc grinder is used to effect equal and/or unequal movement of opposed grinding discs (14L, 14R) as required by grinding stock location, to remove an equal amount of stock from the parallel surfaces (21, 22) of disc-type workpieces (W). A face cut feed system is hydraulically operated to effect first a rapid movement in unison of two grinding heads (11L, 11R) until one or the other disc contacts the workpiece (W), then the movement of each grinding head (11L, 11R) is controlled in response to sequential contact of the discs (14L, 14R) with the corresponding sides (21, 22) of the workpiece (W). Individual motor load sensors (1MLS, 2MLS) actuate motor load relays (1CRE, 2CRE) which are used to control first a sequential momentary stoppage in feed movement of first one and then the other grinding head followed by resumption of further infeed in unison at a slow grinding feed rate, following a momentary controlled time delay. Following the timed delay, an equal amount of stock is removed from each parallel surface (21, 22) of the workpiece (W) as determined by a metered volume of fluid which is discharged from a single displacement cylinder (64), which permits an equal infeed movement to occur in each grinding head (11L, 11R).

BACKGROUND OF THE INVENTION

Field of the invention

This invention relates in general to new and useful improvements in feed mechanisms for grinding machines, and, particularly, for grinding machines having opposed discs. The invention has special application when it is desirable to advance each disc to effect a predetermined equal amount of stock removal from each side of a disc-type workpiece simultaneously, and, particularly when the grinding stock allowance varies from piece to piece in its location with respect to datum reference or locating support surfaces within the workpiece itself.

Description of the prior art

An apparatus for advancing the opposed discs of a horizontal double disc grinder is disclosed in U.S. Pat. 3,001,337, granted Sept. 26, 1961. The feeding movement of the abrasive discs are synchronized to advance at an equal rate controlled by various hydraulic and mechanical arrangements. The power to effect the feeding movement, which advances each disc toward each other, is applied in equal amounts to each of the disc supporting members by means of identical feed mechanisms. A pair of mechanically coupled displacement cylinders are connected to effect equal feed movements at an identical rate by means of fluid being exhausted from the displacement cylinders, which are connected by a common output hydraulic line. In the prior art, a predetermined ground size may be produced between parallel sides of a workpiece even though the exact locations of the surfaces are unknown and variable at the start of the feeding operation. However, the prior art does not provide means to remove a precise amount of stock from each side of the variable thickness of workpieces unless the workpiece is held in a precise longitudinal position.

SUMMARY OF THE INVENTION

In accordance with the invention, the grinding machine includes a pair of grinding heads which support a pair of opposed grinding discs. An equal amount of stock is removed from each surface of the disc-type workpiece. The apparatus of the face cut feed system is hydraulically operated to effect the movement of each grinding head towards the parallel sides of the workpiece. Each disc is advanced an equidistance amount by hydraulic means, simultaneously, until one of the discs contacts the respective side of the workpiece and stops, while the other disc continues to advance until it contacts the opposite side of the workpiece, and stops momentarily, after which both discs advance in unison an equal distance.

In the preferred embodiment, a preset amount of stock is removed from each side of the workpiece by the rotating discs even though the longitudinal position of the workpiece is not precisely held. Dual feed movements are effected at a rapid feed rate, an intermediate feed rate and finally at a slow grinding feed rate when signals are obtained from both of two load control relays. The slow grinding feed rate continues until the piston of a displacement cylinder is advanced to a positive stop position, preceded slightly by its actuation of a limit switch which initiates a sparkout grinding portion of the total cyclic operation.

The instant invention provides a control system for advancing opposed grinding discs without sensing the advance of the discs during stock removal. Likewise, it is not necessary to sense the removal of the stock in order to terminate the advance of the grinding discs. Instead, the positions of the discs are established by advancing each disc at a rapid infeed rate, and then at an intermediate feed rate, following the contact of each disc with the respective opposed surfaces of the workpiece.

A primary object of the instant invention is to provide a control system for advancing opposing grinding discs to remove an equal depth of cut from parallel sides of a disc-type workpiece.

Another object is to enable the workpiece to be ground to a specific tolerance, in terms of stock removal depth, without the use of a gage.

Still another object is to advance each grinding head simultaneously until each disc contacts the workpiece, whereafter the grinding heads are further advanced at a grinding feed rate to remove a predetermined depth of cut from each side of the workpiece.

It is a further object of the invention to remove a minimum amount of material from each surface of the workpiece following signals from motor load sensing devices which control the grinding feed movement.

Another object is to remove an equal amount of stock from two opposite sides of a disc-type workpiece, or other, without requiring a precise longitudinal location of the workpiece within the machine structure.

BRIEF DESCRIPTION OF THE DRAWINGS

FIG. 2 is a diagrammatic hydraulic circuit showing means for synchronizing the operation of a dual feed mechanism of the invention;

FIG. 4 is a block diagram showing another embodiment of a drive control mechanism for advancing the abrasive discs.

DESCRIPTION OF THE PREFERRED EMBODIMENT

Figure 1:
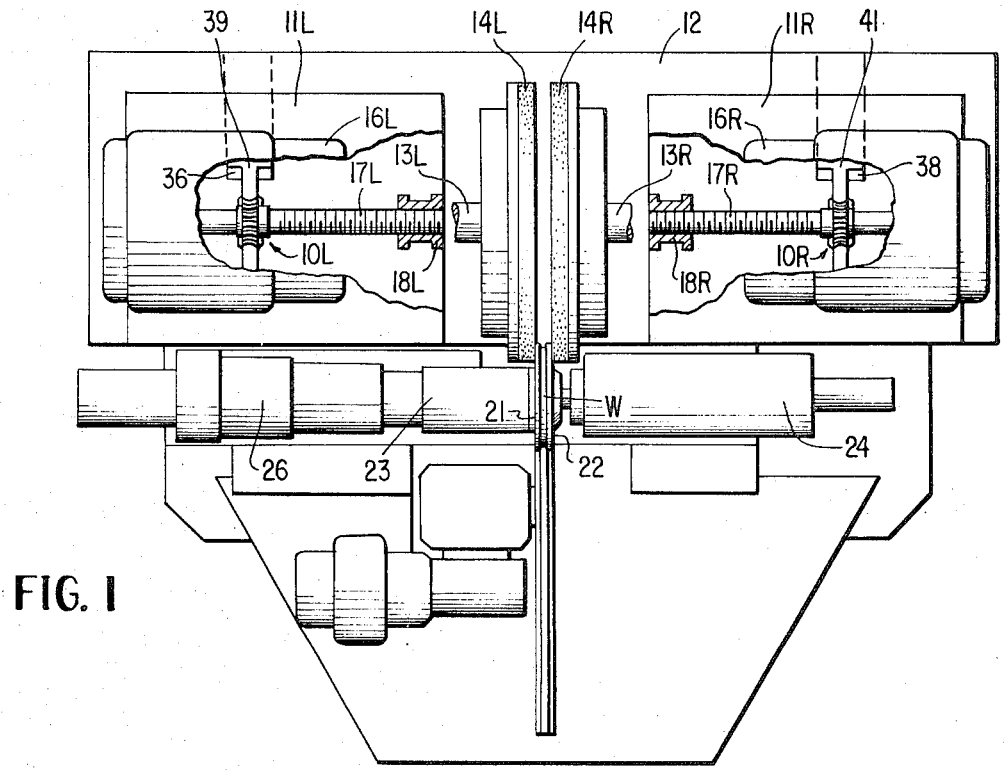
FIG. 1 is a plan view of a horizontal double disc grinding machine embodying the principles of the invention showing the workpiece, grinding discs, and other supporting structure.

Referring now to FIG. 1, there is illustrated a longitudinal feed mechanism 10L and 10R, which advances an opposing pair of grinding heads 11L and 11R towards a disc-type workpiece W. Each of the grinding heads 11L and 11R is slidably mounted on a machine bed 12. The grinding heads 11L and 11R include spindles 13L and 13R, which carry abrasive discs 14L and 14R. The discs 14L and 14R are driven through suitable connections by motors 16L and 16R.

The means for advancing the discs 14L and 14R toward one another consists of feed screws 17L and 17R mounted in the bed 12. The feed screws 17L and 17R are in operative engagement with feed nuts 18L and 18R, which are mounted in the bed 12 and in alignment with the grinding heads 11L and 11R, respectively.

The feed mechanisms 10L and 10R of each grinding head 11L and 11R are substantially identical to those shown and described in the previously mentioned U.S. patent. Accordingly, there will be described here, only the new feed mechanism structure which controls the simultaneous removal of a predetermined amount of stock from the parallel faces or sides 21, 22 of the workpiece W.

The grinding cycle includes a rapid feed rate, an intermediate feed rate and a slow grinding feed rate. The rapid feed rate is effected following the advancement of a headstock 23 to a positive stop position, and the advancement of a tailstock 24 with less force to clamp the workpiece W therebetween by hydraulic means (not shown).

The workpiece W is rotated about a predetermined axis by a headstock drive motor 26, and the flow of coolant is directed against the workpiece W in a conventional manner to provide a cooling effect during the grinding operation and to remove metal dust and abrasive particles.

The L. H. and R. H. discs 14L and 14R are simultaneously advanced at a rapid rate by a hydraulic system to be described hereinafter. This occurs when the high volume pressure of fluid, which had previously retracted the discs 14L and 14R, is reduced. The hydraulic system shown in FIG. 2 includes a pump 27 driven by a motor 28 to direct fluid under pressure from a supply tank 29 through lines 31 and 32 to a valve 33. The valve 33 connects the line 32 to a line 34 when a solenoid SOL-L is energized by electrical control means. A pressure relief valve 35 is included in the line 32 to control the pressure of fluid flowing to the valve 33. The line 34 is connected to the head end of a hydraulic motor or cylinder 36, and a line 37 branching from the line 34 is connected to the head end of a hydraulic motor or cylinder 38. Pistons 39 and 41 are slidably mounted in the cylinders 36 and 38 respectively, and are advanced by the said fluid pressure to effect a rapid feed movement of the discs 14L and 14R by movement of the conventional feed mechanisms 10L and 10R.

Exhaust pressure from the rod end of the cylinder 36 is directed to the rod end of a displacement cylinder 42, through a line 43; and exhaust pressure from the rod end of the cylinder 38 is connected to the rod end of a displacement cylinder 44 through a line 46. The cylinder 42 is housed in a yoke member 47 which supports a piston 48. A piston 49, which is slidably mounted in the cylinder 44, is connected to the opposite end of the yoke member 47. Both cylinders 42 and 44 are mounted upon a common baseplate (not shown). This arrangement ensures simultaneous movement of each piston 48 and 49 at the same rate. A line 51 connects the head end of the cylinder 42 to a valve 52; and a line 53 connects the head end of the cylinder 44 to the same port of the valve 52.

In the specific embodiment shown, the workpiece W is rotatably supported between the headstock 23 and the tailstock 24, and is longitudinally located relative to the longitudinal position of the abrasive discs 14L and 14R.

The discs 14L and 14R are advanced toward the workpiece by the longitudinal movement of the grinding heads 11L and 11R. The discs 14L and 14R are advanced rapidly towards the respective sides 21, 22 of the workpiece W until fluid pressure directed to the rod end of the cylinder 42 and the rod end of the cylinder 44, shifts the yoke member 47 to the right (FIG. 2). A limit switch 4LS is then closed which effects an intermediate feed rate. During this phase of the cycle, the fluid from the head ends of cylinders 42 and 44 is directed through lines 51 and 53, respectively, to a series of three valves 52, 57 and 54 operated by solenoids SOL-R, SOL-U, and SOL-N, respectively. The valves 52 and 57 are positioned to the left as shown in FIG. 2, but valve 54 is positioned to the right by reason of SOL-N being energized as will be explained in connection with FIGS. 3A and 3B. Therefore, the fluid is directed to a line 55, to bypass a restrictor 58 in line 56, and thence freely on to a drain (unnumbered) which is connected to the valve 33.

The closing of the limit switch member 4LS causes the deenergization of solenoid SOL-N shifting the valve 54 to the left to the position shown in FIG. 2. Fluid pressure is now directed from the head end of the cylinder 42 through the line 51 and from the head end of the cylinder 44, through the line 53 to the line 56 and through the valves 52, 57 and 54. The restrictor 58 in line 56 controls the amount of fluid passing through the line 56, thereby effecting the intermediate feed rate.

The discs 14L and 14R continue to be advanced at the intermediate feed rate until one of discs 14L or 14R contact the respective sides 21 and 22 of the workpiece W. Load control relays 1CRE and 2CRE, associated with the drive mechanism for each disc, provide signals to effect a complete restriction of the intermediate feed rate for one of the discs 14L or 14R by energizing solenoid SOL-R which shifts the valve 52 to the right (FIG. 2), regardless of which disc contacts the respective side 21 or 22 of the workpiece W first.

A valve 59 is connected to the line 43, and a valve 61 is connected to the line 46. This arrangement connects the rod end of the cylinders 36 and 38 independently to the valves 59 and 61, respectively. The valves 59 and 61 are positioned by the energization of the solenoids SOL-S or SOL-T, respectively, in response to a signal which has energized the associated load control relay 2CRE or 1CRE.

The energization of solenoid SOL-S or SOL-T will shift the respective valve 59 or 61 to the right (FIG. 2). Whichever solenoid is energized will enable fluid pressure from the rod end of the respective cylinder 36 or 38 to be directed through the respective valve 59 or 61 and drained through line 60 and a restrictor 70. This permits the respective disc to continue advancing at an intermediate rate, until the second load control signal is obtained, while the other disc remains at its position without advancing. When the second disc contacts the other side of the workpiece, a signal from the respective load control relay deenergizes the solenoid SOL-S or SOL-T (whichever had been energized previously) permitting the respective valve to shift leftward (FIG. 2). This completely stops all feeding of the respective disc, and simultaneously energizes a time delay relay 15TR to provide a brief dwell period during which both discs are completely restricted from advancing.

Upon a signal from the dwell time delay relay 15TR, a slow grinding feed rate is effected through the energization of the solenoid SOL-U which shifts the valve 57 to the right. Fluid pressure from the head end of the cylinder 42 and cylinder 44 is now directed through the lines 51 and 53 respectively, and through the valves 52 and 57 by the line 56. A line 62 connects the valve 57 to the head end of the displacement cylinder 64. It is also to be noted that a line 68 connects the rod end of the cylinder 64 to the lines 55 and 56. The line 68 includes a restrictor 69 which controls the rate of fluid being discharged from the cylinder 64 which establishes the rate of the slow final grinding feed.

The displacement cylinder 64 houses a piston 66 which is advanced to the right (FIG. 2) until an adjustable sleeve member 67 contacts a positive stop 67A. A limit switch 11LS is actuated by the sleeve 67 just prior to the positive stop 67A, providing a signal which iniates a final sparkout grinding period as will be explained in connection with FIGS. 3A and 3B.

OPERATION

It is to be understood that the feed system of this invention will be effected during the automatic cycle of a horizontal disc grinder to provide a sequential method of removing a specific amount of stock from the parallel sides 21, 22 of a workpiece W. The feed system is effected following the clamping of a disc-type workpiece W between the headstock 23 and the tailstock 24, which are advanced by conventional means (not shown) when the cycle start pushbutton 11PB is depressed.

It is to be understood that all motors are running except the headstock motor 26 prior to starting the cycle. Various other motors of the machine, irrelevant to this invention, are not shown for obvious reasons.

Rotation of the motor 16L is effected by depressing a start pushbutton 7PB, which completes a circuit through a normally closed stop pushbutton 6PB to energize the L.H. abrasive motor relay 1M. The energization of the relay 1M closes a contact 1M1 to form a holding circuit around the pushbutton 7PB.

A contact 1M2 is closed to complete a circuit through a stop pushbutton 8PB, which is normally closed to energize a R.H. abrasive motor relay 2M, when the start pushbutton 9PB is depressed. The energization of the relay 2M closes a contact 2M1 to provide a holding circuit around the pushbutton 9PB, and to start rotation of the R.H. abrasive motor 16R.

The workpiece W is rotated about a predetermined axis by the headstock drive motor 26, which is effected following the energization of a headstock motor relay 10MF. The relay 10MF is energized during the cycle after a pushbutton 11PB is depressed, as a circuit is completed through a contact 28CR12, providing a timed contact 14TR (relay not shown) has been closed previously upon completion of the advanced tailstock movement as detected by a limit switch (not shown). Coolant flow is directed against the workpiece W in a conventional manner, and the L.H. and R.H. discs 14L and 14R are simultaneously advanced at a rapid rate, an intermediate rate, and a slow grinding feed rate by a hydraulic system as shown in FIG. 2.

The precise axial location and thickness of the workpiece W may vary slightly, and therefore, the amount of stock removal from each side of the workpiece commences upon the engagement of each disc 14L and 14R with the respective sides 21, 22 which provide separate signals from the load control relays 1CRE and 2CRE.

The load control relay 1CRE is energized when the L.H. disc 14L contacts the left side 21 of the workpiece W, and the load control relay 2CRE is energized when the R.H. abrasive disc 14R contacts the right side 22 of the workpiece W.

The following description describes an actual cycle of the machine when the L.H. disc 14L contacts the side 21 of the workpiece W prior to the engagement of the R.H. disc 14R. However, it should be understood that controls are arranged to reverse the procedure, automatically, should the R.H. disc 14R contact the workpiece W prior to the L.H. disc 14L.

Figure 3A:
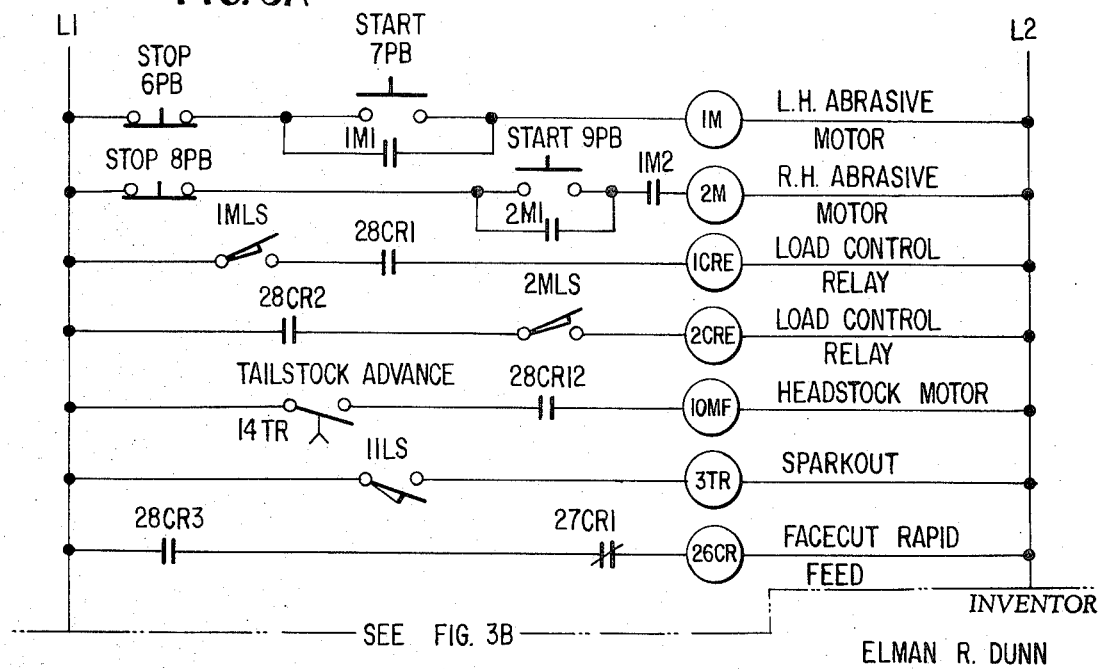
FIGS. 3A and 3B show a wiring diagram of the control circuit for operating the equal face cut feed mechanism.
Figure 3B:
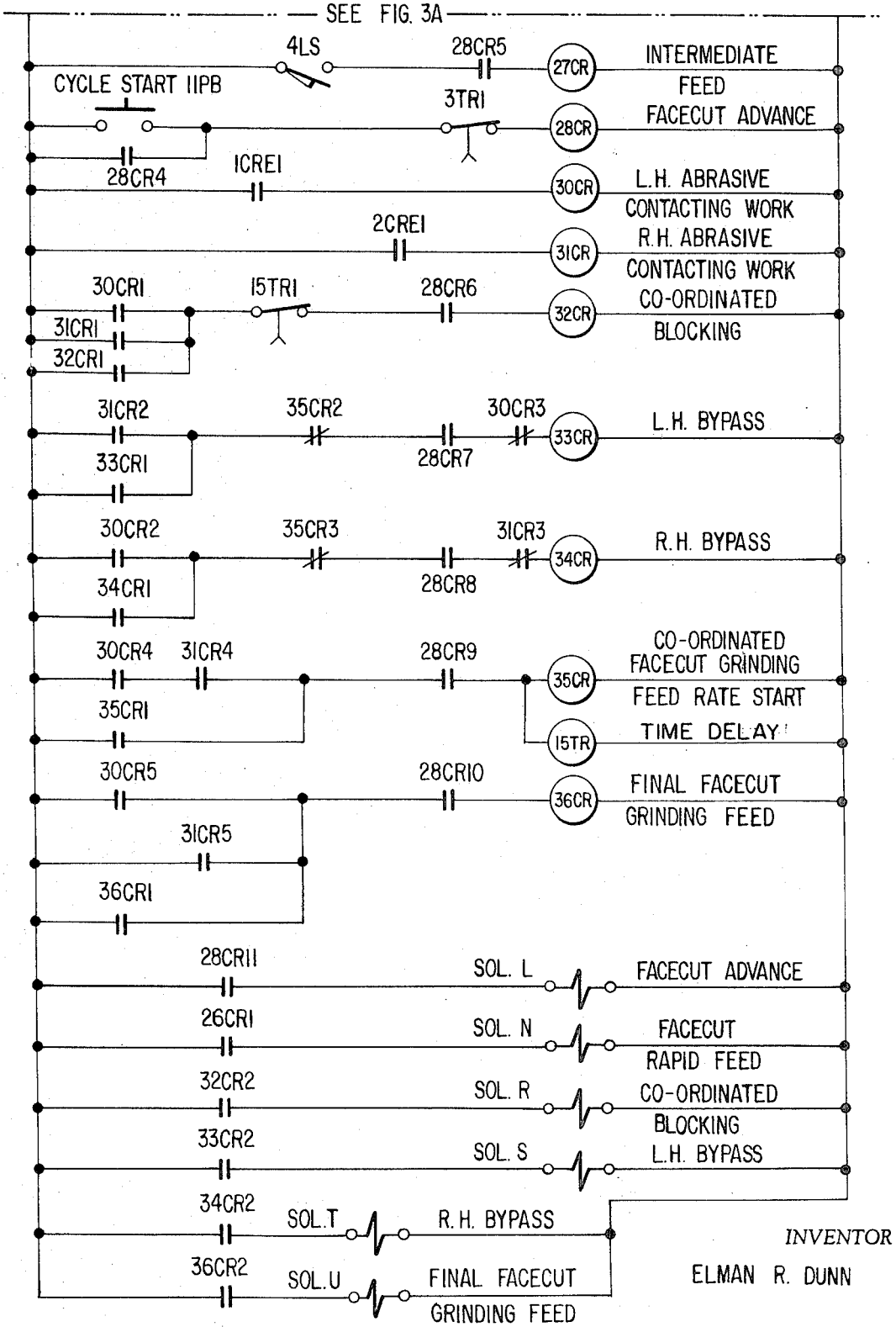

Referring now to FIGS. 3A and 3B, actual cycle is started by depressing the pushbutton 11PB which completes a circuit to energize a face cut advance relay 28CR through a normally closed timer contact 3TR1.

The energization of the relay 28CR closes the contacts 28CR1 and 28CR2 to enable the relays 1CRE and 2CRE to be energized later during the ensuing cycle. A contact 28CR3 is closed which completes a circuit through a normally closed contact 27CR1 to energize a face cut rapid feed relay 26CR, and a contact 28CR4 is closed to provide a holding circuit for the relay 28CR around the pushbutton 11PB.

The energization of the relay 28CR also results in the closing of the contacts 28CR5, 28CR6, 28CR7, 28CR8, 28CR9, 28CR10, 28CR11, and 28CR12. The closing of the contact 28CR11 energizes the solenoid SOL-L and the valve 33 is shifted to the right.

The energization of the relay 26CR closed a contact 26CR1 which completed a circuit to energize a solenoid SOL-N which shifts the valve 54 to the right.

Fluid is pumped from the supply tank 29 through the line 31 by the pump 27 (driven by the motor 28) and is directed to the valve 33 by line 32 and from the valve 33 to the head end of the face cut cylinders 36 and 38 through the lines 34 and 37, respectively. Fluid pressure is governed by the relief valve 35 which returns excess fluid to the tank 29. The pistons 39 and 41 advance the L.H. and R.H. discs 14L and 14R, in unison, aot a rapid infeed rate as fluid discharged from the rod end of the cylinder 36 is directed to the rod end of the cylinder 42 through the line 43, and from the rod end of the cylinder 38 to the rod end of the cylinder 44 through the line 46. Fluid being discharged from the head end of the cylinders 42 and 44 is directed through the lines 51 and 53 and through the valves 52, 57 and 54, as shown in FIG. 2, with the valve 54 being shifted to the right, as stated previously.

The rapid infeed rate continues while fluid discharge being directed to the rod end of the cylinders 42 and 44 shifts the yoke 47 to the right, ultimately actuating the limit switch 4LS. The limit switch 4LS is closed to effect an intermediate feed rate as a circuit is completed through the contact 28CR5 which energizes on intermediate feed relay 27CR.

The energization of the relay 27CR opens the normally closed contact 27CR1 which deenergizes the relay 26CR. The deenergization of the relay 26CR opens the contact 26CR1 and the solenoid SOL-N is deenergized, which shifts the valve 54 to the left (FIG. 2). The fluid discharge rate from the valve 54 is then controlled by the restrictor 58 and the intermediate feed rate thus is effected.

The intermediate feed rate continues until the load control relay 1CRE is energized by the closing of a motor load sensor switch 1MLS when the L.H. abrasive disc 14L contacts the left side 21 of the workpiece W. The energization of the relay 1CRE closes a contact 1CRE1 which completes a circuit to energize a L.H. abrasive contacting work relay 30CR. A contact 30CR1 is closed to complete a circuit through a normally closed timed relay contact 15TR1 and the contact 28CR6 to energize a coordinated blocking relay 32CR.

The energization of the relay 32CR closes a contact 32CR1 which provides a holding circuit around the contact 30CR1 and around a contact 31CR. A contact 32CR2 is closed to energize the solenoid SOL-R and the valve 52 is shifted to the right (FIG. 2). Fluid being discharged from the head end of the cylinders 42 and 44 is thus temporarily blocked, which temporarily stops the advance in unison of the pistons 48 and 49.

The energization of the relay 30CR also closes the contact 30CR2, which completes a circuit through a normally closed contact 35CR3, contact 28CR8, and a normally closed contact 31CR3 to energize a R.H. bypass relay, 34CR. The energization of the relay 30CR also opens a normally closed contact 30CR3 to prevent energization later of a L.H. bypass relay 33CR, and closes the contact 30CR1. The contact 30CR5 also closes to energize a final face cut grinding feed relay 36CR.

The energization of the relay 34CR closes a contact 34CR1 to provide a holding circuit around the contact 30CR2. A contact 34CR2 is closed to energize a solenoid SOL-T, and the valve 61 is shifted to the right (FIG. 2).

Fluid pressure in the rod end of the cylinder 44 is reduced and fluid from the rod end of the cylinder 38 flows through the valve 61 and thence to be exhausted through the restrictor 70, which establishes an intermediate feed rate, permitting infeed of the R.H. disc 14R only.

The R.H. disc 14R will continue to be advanced at an intermediate feed rate as pressure through the line 37 advances the piston 41 to the left. The piston 41 continues to advance to the left as fluid is discharged from the rod end of the cylinder 38 until the R.H. disc 14R contacts the side 22 of the workpiece W.

The load control relay 2CRE is energized by the closing of motor load sensor switch 2MLS when the R.H. disc 14R contacts the side 22 of the workpiece W. A contact 2CRE1 closes, which completes a circuit to energize a R.H. abrasive contacting relay 31CR. Contacts 31CR1 and 31CR2 are closed, but movement is not effected as a normally closed contact 31CR3 opens to deenergize the relay 34CR; a contact 31CR4 closes to energize a relay 35CR and a relay 15TR. The contact 35CR1 closes to provide a holding circuit around the contacts 30CR4, and the contact 31CR4.

A contact 31CR5 closes by the energization of the relay 31CR, and a circuit is completed through the contact 28CR10 to energize the relay 36CR. The energization of the relay 36CR closes a contact 36CR1 to provide a holding circuit around the contact 31CR5, and a contact 36CR2 closes which energizes the solenoid SOL-U. The energization of solenoid SOL-U shifts the valve 57 to the right (FIG. 2) and the line 56 is now connected to the line 62 in preparation for later fluid flow requirements.

The energization of the relay 35CR closes a contact 35CR1 to provide a holding circuit around the contacts 30CR4 and 31CR4, and opens the normally closed contacts 35CR2 and 35CR3 to insure that neither of the relays 33CR or 34CR are energized during the remainder of the grinding cycle. The deenergization of the relay 34CR opens the contact 34CR1 and the contact 34CR2. The opening of the contact 34CR2 deenergizes SOL-T, and the valve 61 is shifted to the left (FIG. 2), stopping further fluid discharge from the rod end of a cylinder 38 through the valve 61, thus stopping further independent (bypass) infeed movement of the R.H. disc 14R. At this moment, both discs 14L and 14R are in contact with the sides 21 and 22, respectively, of workpiece W, and neither disc is advancing toward the workpiece.

The normally closed timer contact 15TR1 is timed open after a dwell period, following the previously stated energization of the timer relay 15TR, and the relay 32CR is deenergized. The contact 32CR2 is opened, and the solenoid SOL-R is deenergized which shifts the valve 52 to the left (FIG. 2).

The shifting of the valve 52 to the left permits fluid discharge of equal volumes from the head end of the cylinders 42 and 44 to flow through the lines 51, 53, and through the valves 52 and 57. The fluid flows to the head end of the disaplacement cylinders 64 through the line 62, insuring the transfer of equal fluid volumes from the rod ends of the cylinders 36 and 38 into the rod ends of the cylinders 42 and 44, respectively.

The piston 66 advances to the right and a slow grinding feed rate is effected. The rate of the slow feed is determined by the restrictor 69 which controls the rate of fluid being discharged from the rod end of the displacement cylinder 64. The discharged fluid is directed through the line 68 which is connected to the line 56, through the line 55, and fluid is thus directed through the valve 33 to the drain (unnumbered).

By virtue of the equal final advancing motion of the pistons 39 and 41, a predetermined amount of stock is removed from each side 21, 22 of the workpiece W. The total amount of stock removal is determined by the linear movement of the piston 66, which continues until the limit switch 11LS is closed by actuation by the adjustable sleeve member 67, which thereafter contacts the positive stop 67A.

The closing of limit switch 11LS completes a circuit to energize a sparkout timer relay 3TR, which effects a sparkout grinding operation to improve the finish before the discs are retracted in a conventional manner. The opening of the normally closed timer contact 3TR1 deenergizes the relay 28CR which opens the contacts 28CR3, 28CR10 and 28CR11 causing the discs to retract. The contact 28CR12 also opens which deenergizes the headstock motor relay 10MF therefore, the headstock drive motor 26 stops workpiece rotation. The deenergization of the relay 28CR results in all solenoid valves shown in FIG. 2 now being deenergized as illustrated.

Fluid pressure from the pump 27 flows through the valves 33, 58A, 54, 57 and 52 and through the lines 51 and 53 to reset the pistons 48 and 49 of the cylinders 42 and 44, respectively, to their initial starting position leftward (FIG. 2); and forcing fluid discharge from the rod end of cylinders 42 and 44 into the rod ends of the cylinders 36 and 38, respectively, to reset their pistons 39 and 41. In normal operating circumstances, either piston 39 or 41 may thus not be completely reset to its initial starting position because one of the pistons may have been advanced farther than the other through the previously described operation of its associated bypass solenoid valve, 59 or 61, respectively. To assure complete reset of pistons 39 and 41, fluid pressure flows through a restrictor 75 and a check valve 76 in line 74, and/or a restrictor 71 and a check valve 72 in line 73 into the rod ends of the cylinders 36 and/or 38, respectively, to assure complete reset of the pistons 39 and 41.

Fluid pressure also flows through the line 68 and through a check valve 77 into the rod end of the cylinder 64 to reset the piston 66 to its initial starting position. This motion permits the limit switch 11LS to open, in preparation for a succeeding cycle of operation.

The above cycle of operation is effected in a similar manner should the R.H. disc 14R contact the workpiece W prior to the L.H. disc 14L. However, the intermediate feed rate would now be terminated when the load control relay 2CRE is energized by the closing of a motor load sensor switch 2MLS. This occurs when the R.H. abrasive disc 14R contacts the right side 22 of the workpiece W. The energization of the relay 2CRE closes a contact 2CRE1 which completes a circuit to energize a R.H. abrasive disc contacting work relay 31CR. The contact 31CR1 is closed to complete a circuit through the normally closed timed relay contact 15TR1 and the contact 28CR6 to energize the relay 32CR.

The energization of the relay 32CR closes the contact 32CR1 which provides a holding circuit around the contact 31CR1 and around the contact 30CR1. The contact 32CR2 closes to energize the solenoid SOL-R and the valve 52 is shifted to the right. Fluid being discharged from the head end of the cylinders 42 and 44 is thus temporarily blocked, which momentarily stops the advance in unison of the pistons 48 and 49.

The energization of the relay 31CR also closes the contact 31CR2 which completes a circuit through a normally closed contact 35CR2, contact 28CR7 and a normally closed contact 30CR3 to energize a L.H. bypass relay 33CR. A contact 33CR1 closes to form a holding circuit around the contact 31CR2 and a contact 33CR2 closes to energize a solenoid SOL-S. The valve 59 is shifted to the right and fluid pressure in the rod end of the cylinder 42 is reduced. Fluid from the rod end of the cylinder 36 is permitted to flow through the line 43, the valve 59 and the line 60 to be exhausted through the resrictor 70 which establishes an intermediate feed rate, permitting infeed of the disc 14L only.

The L.H. disc 14L continues to advance at an intermediate feed rate as pressure through the line 34 advances the piston 39 to the right.

The piston 39 continues to advance to the right as fluid is discharged from the rod end of the cylinder 36 until the L.H. disc 14L contacts the side 21 of the workpiece W.

The load conrol relay 1CRE is energized by the closing of the motor load sensor switch 1MLS when the L.H. disc 14L contacts, the side 21 of the workpiece W. A contact 1CRE1 is closed, which completes a circuit to energize a L.H. abrasive contacting relay 30CR and the slow grinding feed of both discs 14R and 14L in unison will be effected, as previously discussed, through the operation of the displacement cylinder 64 and its associated lines and valves.

It is to be understood that drives other than fluid cylinders could be used as the drive means for the instant invention. For example, stepping motors 81 and 82 as shown in FIG. 4 are connected to an electronic circuit 83 which receives signals when the load control relays 1CRE and 2CRE are energized. The circuit 83 would include appropriate control means including a delay block 86, a logic circuit 87, and drivers 88 and 89. The logic circuit 87 directs pulse signals through the drivers 88 and 89. The frequency of the pulses determines the rate at which the stepping motors 81 and 82 and feed screws 17L and 17R rotate to advance the L.H. and R.H. discs 14L and 14R a preset longitudinal amount following the actual contacting of the discs with the sides of the workpiece.

It is to be understood that only a preferred embodiment of the invention has been specifically illustrated and described, and that variations may be made thereto without departing from the invention as defined in the appended claims.

I claim:

1. In an improved double disc grinding machine for effecting a predetermined depth of cut from the parallel sides of a disc-type workpiece, the machine including a pair of grinding discs, means for supporting and rotating said discs, and means for supporting the said workpiece, wherein the improvement comprises:
   means for advancing both of the discs equally, in unison, until one of said discs engages the workpiece, and
   means operable in response to engagement of said one of said grinding discs with one side of said workpiece for stopping the advance of said one disc until said other disc engages the other side of the said workpiece, and thereafter resuming, in unison, the advancing of both of said discs and equal and predetermined distance beyond the initial points of their engagement with said workpiece.

2. A grinding machine as recited in claim 1, wherein, said stopping means includes a pair of load control relays, one associated with each of said discs, for providing a signal to stop the advance of the first disc that contacts the workpiece.

3. A grinding machine as recited in claim 2, wherein, said advancing means includes two hydraulic motors for advancing the respective grinding discs, and wherein, said load control relay which is first energized by contact of its respective disc renders effective means for disabling only the hydraulic motor associated with the disc which is first to contact the workpiece.

4. A grinding machine as recited in claim 3, wherein, said means for advancing the discs an equal and predetermined distance beyond the initial points of their engagement includes, a displacement cylinder, said cylinder being connected to the discharge of said two hydraulic motors so that each of said discs is advanced a further distance determined by the volume of said displacement cylinder.

5. In a double disc grinding machine, the machine including a pair of grinding discs for making predetermined depth of cuts against opposed sides of a workpiece, said machine including:
   means for supporting and rotating said discs;
   a separate feed mechanism for advancing each of said discs towards the workpiece which includes:
      a pair of hydraulic motors each having a cylinder and a piston driven rod connected to the discs;
      a pump for supplying fluid under pressure to the head ends of said cylinders;
   a pair of displacement cylinders each having a piston, said cylinders being connected at one end to the respective discharges of said previously recited cylinders;
   a yoke for connecting said pistons of said displacement cylinders so that they move in unison to synchronize the movement of said discs;
   means for controlling the discharge of fluid from the other end of said displacement cylinders to provide a rapid and then an intermediate feed rate;
   means, including load control relays associated with each of said feed mechanism, for terminating the advance of the first disc that contacts the workpiece while said other disc continues to advance;
   a third displacement cylinder for controlling the depth of cut on said workpiece; and
   circuit means being completed once both discs have contacted the workpiece for connecting the rod ends of said hydraulic motors to said third displacement cylinder so that said discs advance a further predetermined distance toward said workpiece.

6. A grinding machine as recited in claim 5, which further includes, means positioned in a discharge line connected to said third displacement cylinder for restricting the flow of fluid therethrough to provide a slow feed rate during the grinding cycle.

References Cited

UNITED STATES PATENTS

| | | | |
|---|---|---|---|
| 2,168,596 | 8/1939 | Hall | 51—111 |
| 2,871,625 | 2/1959 | Price | 51—118 |
| 3,001,337 | 9/1961 | Dunn | 51—111 |
| 3,382,622 | 5/1968 | Dunn | 51—115 |
| 3,513,600 | 6/1970 | Dunn | 51—165.8 |
| 3,548,549 | 12/1970 | Dunn | 51—118 |
| 3,561,164 | 2/1971 | Dunn | 51—116 |
| 3,473,269 | 10/1969 | Sattler et al. | 51—165.77 |

LESTER M. SWINGLE, Primary Examiner

U.S. Cl. X.R.

51—165.8